US012632998B2

(12) United States Patent
Sterkin et al.

(10) Patent No.: US 12,632,998 B2
(45) Date of Patent: May 19, 2026

(54) PLAUSIBLE DAYSCALE TIMELAPSE GENERATION METHOD AND COMPUTING DEVICE

(71) Applicant: Samsung Electronics Co., Ltd., Suwon-si (KR)

(72) Inventors: Gleb Mikhailovich Sterkin, Moscow (RU); Ivan Aleksandrovich Anokhin, Moscow (RU); Taras Andreevich Khakhulin, Moscow (RU); Aleksei Vladislavovich Kharlamov, Moscow (RU); Denis Mikhailovich Korzhenkov, Moscow (RU); Victor Sergeevich Lempitsky, Moscow (RU); Sergey Igorevich Nikolenko, Moscow (RU); Aleksei Sergeevich Silvestrov, Moscow (RU); Pavel Ilich Solovev, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 17/741,959

(22) Filed: May 11, 2022

(65) Prior Publication Data

US 2022/0270304 A1 Aug. 25, 2022

Related U.S. Application Data

(63) Continuation of application No. PCT/KR2020/015687, filed on Nov. 10, 2020.

(30) Foreign Application Priority Data

Nov. 15, 2019 (RU) ............................ RU2019136769
Apr. 7, 2020 (RU) ............................ RU2020113037

(51) Int. Cl.
*G06T 11/00* (2026.01)
*G06N 20/20* (2019.01)
(Continued)

(52) U.S. Cl.
CPC .............. *G06T 11/00* (2013.01); *G06N 20/20* (2019.01); *G06T 3/40* (2013.01); *G06T 7/10* (2017.01);
(Continued)

(58) Field of Classification Search
CPC . G06T 11/00; G06T 7/10; G06T 2207/10016; G06T 2207/20016; G06N 20/20
See application file for complete search history.

(56) References Cited

U.S. PATENT DOCUMENTS 7,365,744 B2 4/2008 Fang et al.
8,515,270 B1 8/2013 Posehn
(Continued)

FOREIGN PATENT DOCUMENTS

CN 106651766 A 5/2017
CN 108470320 A 8/2018
(Continued)

OTHER PUBLICATIONS

Nam, S., Ma, C., Chai, M., Brendel, W., Xu, N., & Kim, S. J. (Apr. 1, 2019). End-to-end time-lapse video synthesis from a single outdoor image. arXiv.org. https://arxiv.org/abs/1904.00680 (Year: 2019).*
(Continued)

*Primary Examiner* — Gregory A Morse
*Assistant Examiner* — David Alexander Wambst
(74) *Attorney, Agent, or Firm* — Jefferson IP Law, LLP

(57) ABSTRACT

The disclosure relates to a field of plausible timelapse image(s) generation from a single image. A method of generating one or more images of a plausible dayscale
(Continued)

timelapse sequence based on a content image using a trained generative neural network and a trained merging neural network is provided. The method includes receiving the content image and one of one or more predefined styles respectively corresponding to times of day to be applied to the content image or style images having styles to be applied to the content image, slicing the content image into n image crops, applying the trained generative neural network with each style to n image crops to obtain n image crops re-stylized according to each style, and merging the re-stylized n image crops for each style with the trained merging neural network to obtain images of a plausible dayscale timelapse sequence for the content image.

16 Claims, 10 Drawing Sheets

(51) Int. Cl.
  G06T 3/40 (2024.01)
  G06T 7/10 (2017.01)
(52) U.S. Cl.
  CPC .............. *G06T 2207/10016* (2013.01); *G06T 2207/20016* (2013.01); *G06T 2207/20081* (2013.01); *G06T 2207/20084* (2013.01); *G06T 2207/20132* (2013.01); *G06T 2207/20221* (2013.01); *G06T 2210/22* (2013.01)

(56) References Cited

U.S. PATENT DOCUMENTS

| | | | |
|---|---|---|---|
| 10,535,164 B2 | 1/2020 | Shlens et al. | |
| 2006/0209090 A1 | 9/2006 | Kelly et al. | |
| 2012/0070098 A1 | 3/2012 | Gohshi | |
| 2016/0343402 A1 | 11/2016 | Singhal et al. | |
| 2017/0054936 A1 | 2/2017 | Hanayama | |
| 2017/0301095 A1* | 10/2017 | Zhang ...................... | G06T 5/10 |
| 2018/0068463 A1 | 3/2018 | Risser | |
| 2018/0075581 A1 | 3/2018 | Shi et al. | |
| 2018/0322662 A1 | 11/2018 | Hellier et al. | |
| 2018/0357800 A1 | 12/2018 | Oxholm et al. | |
| 2019/0026870 A1 | 1/2019 | Hu et al. | |
| 2019/0236814 A1 | 8/2019 | Shlens et al. | |
| 2019/0244060 A1 | 8/2019 | Dundar et al. | |

FOREIGN PATENT DOCUMENTS

| | | |
|---|---|---|
| CN | 109840575 A | 6/2019 |
| CN | 109863537 A | 6/2019 |
| CN | 110222722 A | 9/2019 |
| WO | 2017/111302 A1 | 6/2017 |

OTHER PUBLICATIONS

Huang, Z., Zhang, J., & Liao, J. (Oct. 29, 2019). Style mixer: Semantic-aware multi-style transfer network. arXiv.org. https://arxiv.org/abs/1910.13093 (Year: 2019).*
Dertat, A. (Oct. 8, 2017). Applied deep learning—part 3: Autoencoders. Medium. https://towardsdatascience.com/applied-deep-learning-part-3-autoencoders-1c083af4d798 (Year: 2017).*
He, K., Zhang, X., Ren, S., & Sun, J. (Dec. 10, 2015). Deep residual learning for image recognition. arXiv.org. https://arxiv.org/abs/1512.03385 (Year: 2015).*
Xu, X., Chen, Y.-C., & Jia, J. (Oct. 1, 2019). View independent generative Adversarial Network for . . . https://openaccess.thecvf.com/content_ICCV_2019/papers/Xu_View_Independent_Generative_Adversarial_Network_for_Novel_View_Synthesis_ICCV_2019_paper.pdf (Year: 2019).*

Du, Z., Yang, J., Ou, C., & Zhang, T. (2019). Smallholder Crop Area Mapped with a Semantic Segmentation Deep Learning Method Remote Sensing, 11(7), 888. https://doi.org/10.3390/rs11070888 (Year: 2019).*
Sheng, L., Lin, Z., Shao, J., & Wang, X. (2018). Avatar-Net: Multi-scale Zero-shot Style Transfer by Feature Decoration. ArXiv.org. https://arxiv.org/abs/1805.03857 (Year: 2018).*
Park, D. Y., & Lee, K. H. (2018). Arbitrary Style Transfer with Style-Attentional Networks. ArXiv.org. https://arxiv.org/abs/1812.02342 (Year: 2018).*
Shih, Y., Paris, S., Durand, F., & Freeman, W. T. (2013). Data-driven hallucination of different times of day from a single outdoor photo. ACM Transactions on Graphics, 32(6), 1-11. https://doi.org/10.1145/2508363.2508419 (Year: 2013).*
Xu, Z., Wilber, M., Fang, C., Hertzmann, A., & Jin, H. (2019). Learning from Multi-domain Artistic Images for Arbitrary Style Transfer. ArXiv:1805.09987 [Cs]. https://arxiv.org/abs/1805.09987 (Year: 2019).*
Yoo, J., Uh, Y., Chun, S., Kang, B., & Ha, J.-W. (2019). Photorealistic Style Transfer via Wavelet Transforms. Thecvf.com, 9036-9045. https://openaccess.thecvf.com/content_ICCV_2019/html/Yoo_Photorealistic_Style_Transfer_via_Wavelet_Transforms_ICCV_2019_paper.html (Year: 2019).*
Huang, X., & Belongie, S. (2017). Arbitrary Style Transfer in Real-time with Adaptive Instance Normalization. ArXiv:1703.06868 [Cs] . https://arxiv.org/abs/1703.06868 (Year: 2017).*
Sveinn Palsson, Eirikur Agustsson, Radu Timofte, & Gool, L. V. (2018). Generative Adversarial Style Transfer Networks for Face Aging. 2022 IEEE/CVF Conference on Computer Vision and Pattern Recognition Workshops (CVPRW), 2165-21658. https://doi.org/10.1109/cvprw.2018.00282 (Year: 2018).*
Ioannou, E., & Maddock, S. (2022). Depth-aware Neural Style Transfer using Instance Normalization. White Rose Research Online (University of Leeds, the University of Sheffield, University of York). https://doi.org/10.2312/cgvc.20221165 (Year: 2022).*
European Search Report dated Feb. 10, 2023, issued in European Patent Application No. 20886588.1.
Yichang Shih et al., Data-driven Hallucination of Different Times of Day from a Single Outdoor Photo (Nov. 1, 2013).
Zixuan Huang et al., Style Mixer: Semantic-aware Multi-Style Transfer Network (Oct. 29, 2019).
Ming-Yu Liu et al., Few-Shot Unsupervised Image-to-Image Translation (Sep. 9, 2019).
Jaejun Yoo et al., Photorealistic Style Transfer via Wavelet Transforms (Sep. 9, 2019).
Nam et al., End-to-End Time-Lapse Video Synthesis from a Single Outdoor Image (Apr. 1, 2019).
Xiong et al., Learning to Generate Time-Lapse Videos Using Multi-Stage Dynamic Generative Adversarial Networks (Sep. 22, 2019).
Pan et al., Video Generation from Single Semantic Label Map (Mar. 11, 2019).
Anoosheh et al., Night-to-Day Image Translation for Retrieval-based Localization (Sep. 26, 2018).
Choi et al., StarGAN: Unified Generative Adversarial Networks for Multi-Domain Image-to-Image Translation (Jun. 2018).
Chu et al., CycleGAN, a Master of Steganography (Dec. 16, 2017).
Endo et al., Animating Landscape: Self-Supervised Learning of Decoupled Motion and Appearance for Single-Image Video Synthesis (Oct. 16, 2019).
He et al., Guided Image Filtering (Jun. 2013).
He et al., Progressive Color Transfer with Dense Semantic Correspondences (Dec. 12, 2018).
Huang et al., Arbitrary Style Transfer in Real-time with Adaptive Instance Normalization (Jul. 30, 2017).
Huang et al., Multimodal Unsupervised Image-to-Image Translation (Aug. 14, 2018).
Isola et al., Image-to-Image Translation with Conditional Adversarial Networks (Nov. 21, 2016).
Kotovenko et al., Content and Style Disentanglement for Artistic Style Transfer (Oct. 2019).
Laffont et al., Transient Attributes for High-Level Understanding and Editing of Outdoor Scenes (Jul. 2014).

(56)          References Cited

OTHER PUBLICATIONS

Lee et al., DRIT++: Diverse Image-to-Image Translation via Disentangled Representations (May 2, 2019).
Lee et al., Diverse Image-to-Image Translation via Disentangled Representations (Aug. 2, 2018).
Li et al., A Closed-form Solution to Photorealistic Image Stylization (Jul. 27, 2018).
Liu et al., Unsupervised Image-to-Image Translation Networks (Mar. 2, 2017).
Mao et al., Least Squares Generative Adversarial Networks (Feb. 24, 2017).
Miyato et al., Cgans With Projection Discriminator (Aug. 15, 2018).
Nilsback et al., Automated flower classification over a large number of classes (Dec. 2008).
Ronneberger et al., U-Net: Convolutional Networks for Biomedical Image Segmentation (May 18, 2015).
Sun et al., Correlation Alignment for Unsupervised Domain Adaptation (Dec. 6, 2016).
Sun et al., Deep High-Resolution Representation Learning for Human Pose Estimation (Feb. 25, 2019).
Wang et al., High-Resolution Image Synthesis and Semantic Manipulation with Conditional GANs (Jun. 2018).
Wang et al., ESRGAN: Enhanced Super-Resolution Generative Adversarial Networks (Sep. 17, 2018).
Zhu et al., Unpaired Image-to-Image Translation using Cycle-Consistent Adversarial Networks (Mar. 2017).
Russian Search Report dated Oct. 23, 2020, issued in Russian Patent Application No. 2020113037.
Russian Office Action dated Oct. 26, 2020, issued in Russian Patent Application No. 2020113037.
Russian Decision to Grant dated Mar. 3, 2021, issued in Russian Patent Application No. 2020113037.
Korean Office Action dated Mar. 18, 2025, issued in a Korean Patent Application No. 10-2022-7008530.
Chinese Office Action dated Apr. 18, 2025, issued in a Chinese Patent Application No. 202080079227.3.
European Examination Report dated Nov. 27, 2025, issued in European Application No. 20886588.1.
Chinese Office Action dated Jan. 12, 2026, issued in Chinese Application No. 202080079227.3.
Chinese Office Action dated Mar. 16, 2026, issued in Chinese Application No. 202080079227.3.
Hui Li et al., Image Style Transfer Algorithm Under Deep Convolutional Neural Network, Computer Engineering and Applications, 2020.
Lechao Cheng et al., Synthesizing the Four Seasons of a Scene From Large-Scale Web Images, Journal of Computer-Aided Design & Computer Graphics vol. 30 No. 5, May 2018.

* cited by examiner

FIG. 2

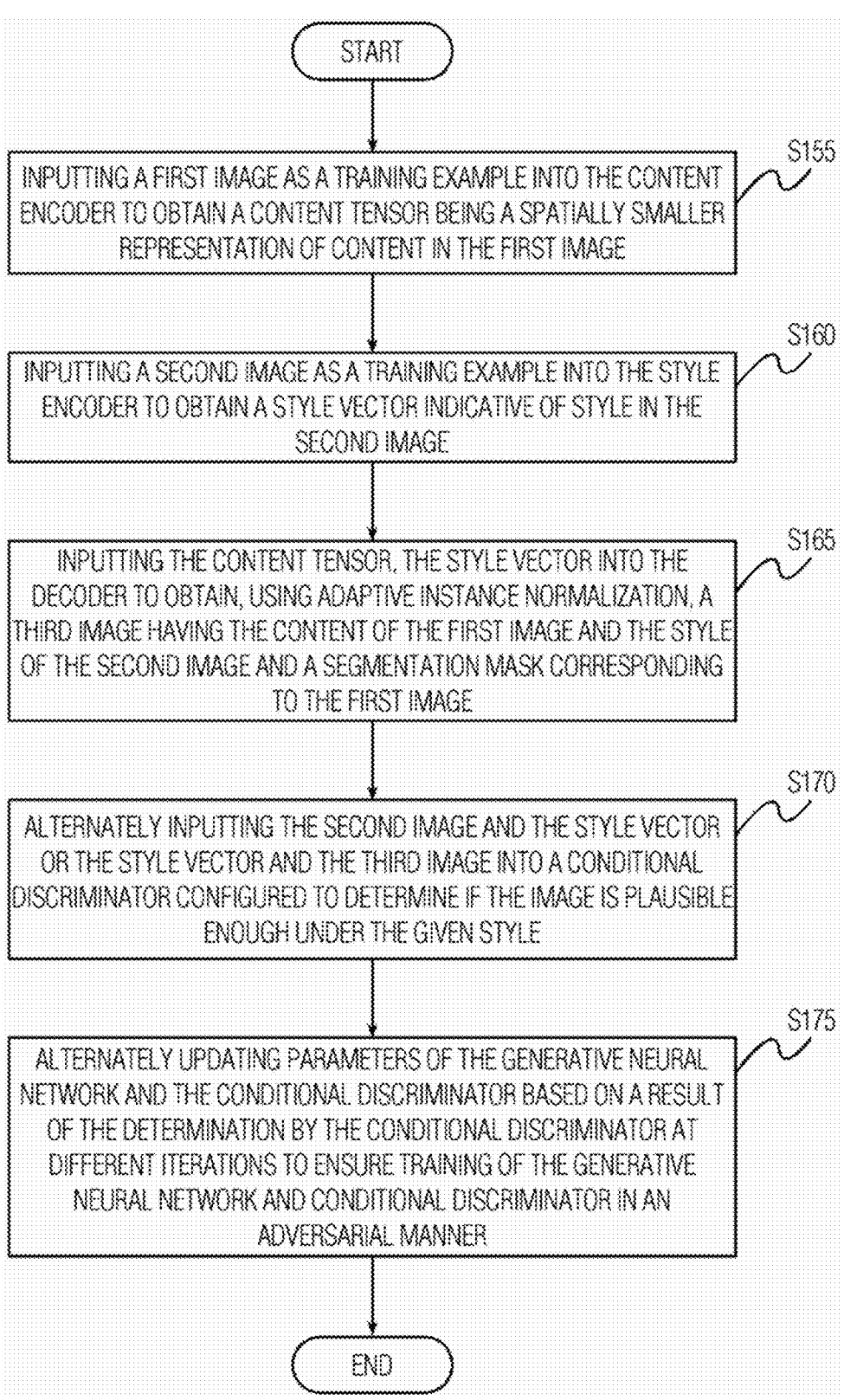

START

S155
INPUTTING A FIRST IMAGE AS A TRAINING EXAMPLE INTO THE CONTENT ENCODER TO OBTAIN A CONTENT TENSOR BEING A SPATIALLY SMALLER REPRESENTATION OF CONTENT IN THE FIRST IMAGE

S160
INPUTTING A SECOND IMAGE AS A TRAINING EXAMPLE INTO THE STYLE ENCODER TO OBTAIN A STYLE VECTOR INDICATIVE OF STYLE IN THE SECOND IMAGE

S165
INPUTTING THE CONTENT TENSOR, THE STYLE VECTOR INTO THE DECODER TO OBTAIN, USING ADAPTIVE INSTANCE NORMALIZATION, A THIRD IMAGE HAVING THE CONTENT OF THE FIRST IMAGE AND THE STYLE OF THE SECOND IMAGE AND A SEGMENTATION MASK CORRESPONDING TO THE FIRST IMAGE

S170
ALTERNATELY INPUTTING THE SECOND IMAGE AND THE STYLE VECTOR OR THE STYLE VECTOR AND THE THIRD IMAGE INTO A CONDITIONAL DISCRIMINATOR CONFIGURED TO DETERMINE IF THE IMAGE IS PLAUSIBLE ENOUGH UNDER THE GIVEN STYLE

S175
ALTERNATELY UPDATING PARAMETERS OF THE GENERATIVE NEURAL NETWORK AND THE CONDITIONAL DISCRIMINATOR BASED ON A RESULT OF THE DETERMINATION BY THE CONDITIONAL DISCRIMINATOR AT DIFFERENT ITERATIONS TO ENSURE TRAINING OF THE GENERATIVE NEURAL NETWORK AND CONDITIONAL DISCRIMINATOR IN AN ADVERSARIAL MANNER

END

FIG. 3

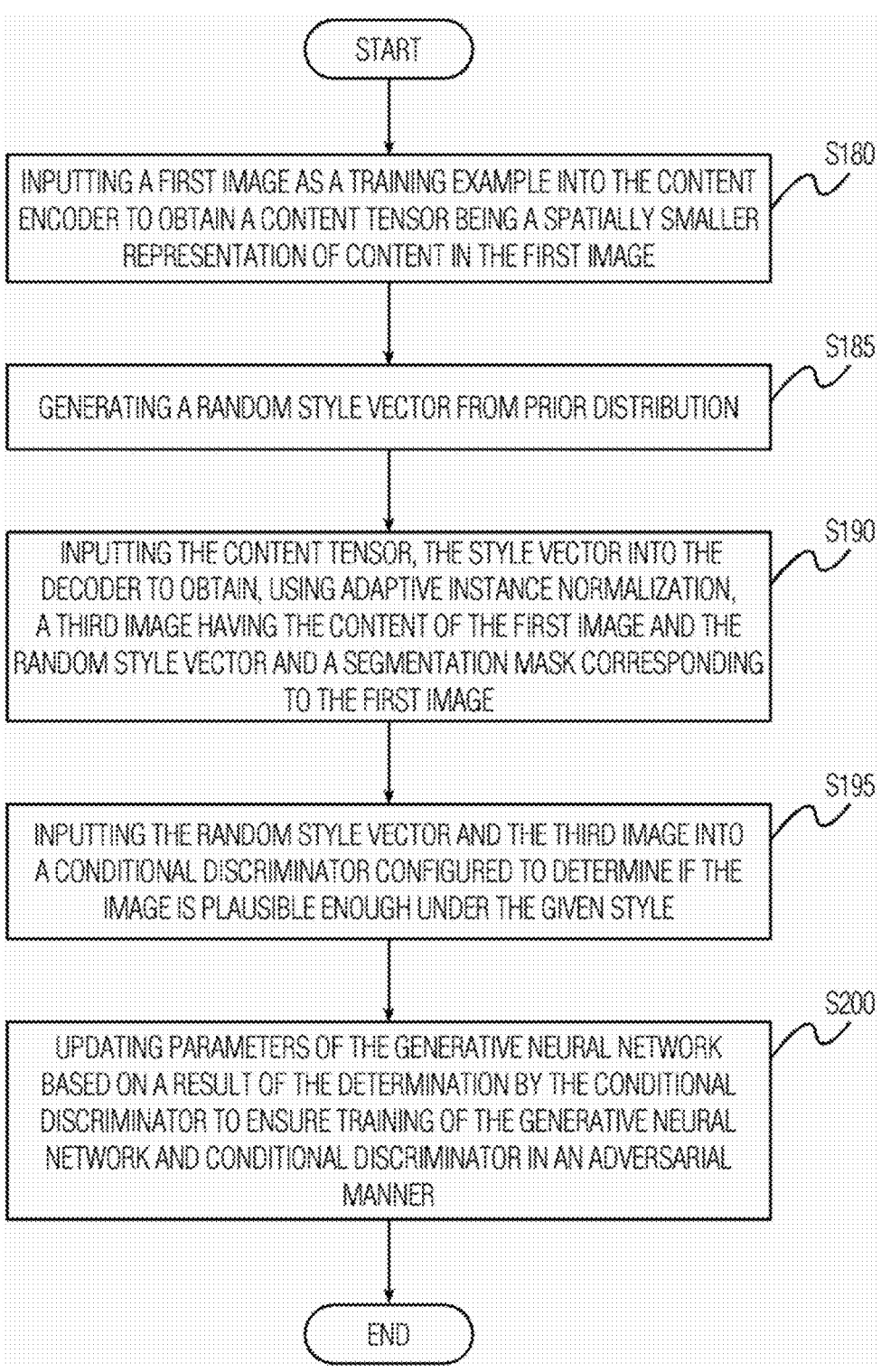

START

INPUTTING A FIRST IMAGE AS A TRAINING EXAMPLE INTO THE CONTENT ENCODER TO OBTAIN A CONTENT TENSOR BEING A SPATIALLY SMALLER REPRESENTATION OF CONTENT IN THE FIRST IMAGE — S180

GENERATING A RANDOM STYLE VECTOR FROM PRIOR DISTRIBUTION — S185

INPUTTING THE CONTENT TENSOR, THE STYLE VECTOR INTO THE DECODER TO OBTAIN, USING ADAPTIVE INSTANCE NORMALIZATION, A THIRD IMAGE HAVING THE CONTENT OF THE FIRST IMAGE AND THE RANDOM STYLE VECTOR AND A SEGMENTATION MASK CORRESPONDING TO THE FIRST IMAGE — S190

INPUTTING THE RANDOM STYLE VECTOR AND THE THIRD IMAGE INTO A CONDITIONAL DISCRIMINATOR CONFIGURED TO DETERMINE IF THE IMAGE IS PLAUSIBLE ENOUGH UNDER THE GIVEN STYLE — S195

UPDATING PARAMETERS OF THE GENERATIVE NEURAL NETWORK BASED ON A RESULT OF THE DETERMINATION BY THE CONDITIONAL DISCRIMINATOR TO ENSURE TRAINING OF THE GENERATIVE NEURAL NETWORK AND CONDITIONAL DISCRIMINATOR IN AN ADVERSARIAL MANNER — S200

END

FIG. 4

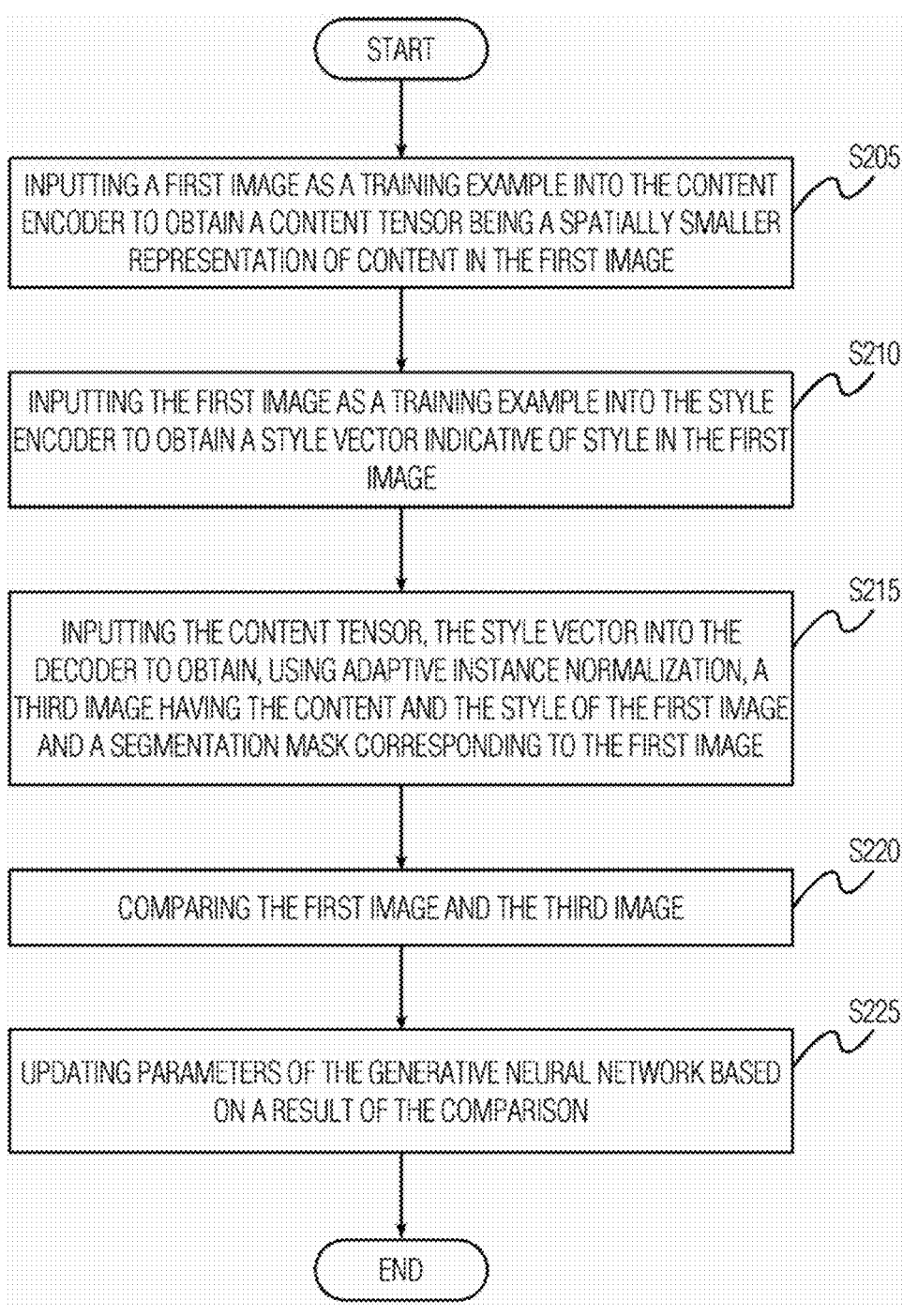

START

INPUTTING A FIRST IMAGE AS A TRAINING EXAMPLE INTO THE CONTENT ENCODER TO OBTAIN A CONTENT TENSOR BEING A SPATIALLY SMALLER REPRESENTATION OF CONTENT IN THE FIRST IMAGE — S205

INPUTTING THE FIRST IMAGE AS A TRAINING EXAMPLE INTO THE STYLE ENCODER TO OBTAIN A STYLE VECTOR INDICATIVE OF STYLE IN THE FIRST IMAGE — S210

INPUTTING THE CONTENT TENSOR, THE STYLE VECTOR INTO THE DECODER TO OBTAIN, USING ADAPTIVE INSTANCE NORMALIZATION, A THIRD IMAGE HAVING THE CONTENT AND THE STYLE OF THE FIRST IMAGE AND A SEGMENTATION MASK CORRESPONDING TO THE FIRST IMAGE — S215

COMPARING THE FIRST IMAGE AND THE THIRD IMAGE — S220

UPDATING PARAMETERS OF THE GENERATIVE NEURAL NETWORK BASED ON A RESULT OF THE COMPARISON — S225

END

FIG. 5

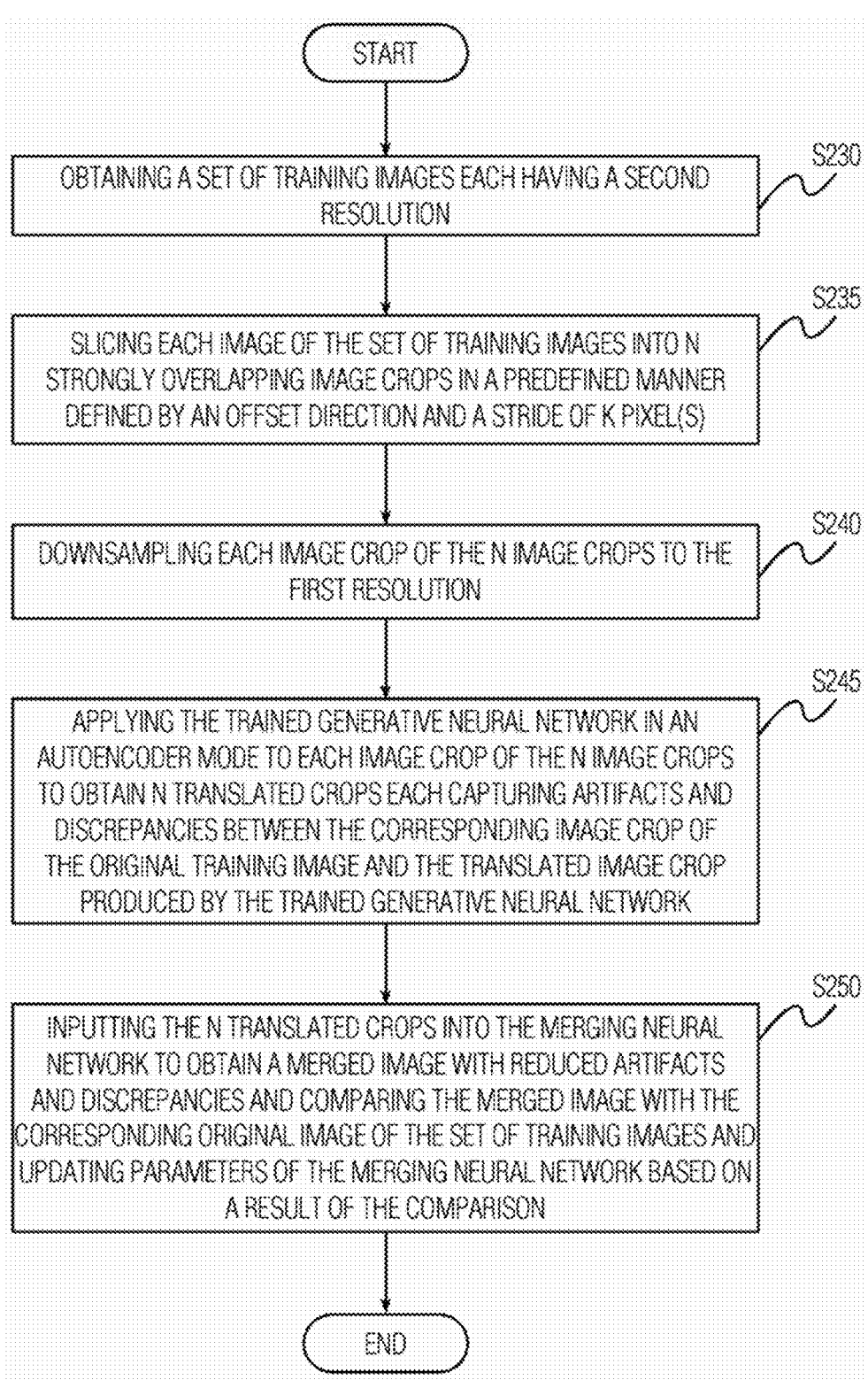

START

OBTAINING A SET OF TRAINING IMAGES EACH HAVING A SECOND RESOLUTION ⟿ S230

SLICING EACH IMAGE OF THE SET OF TRAINING IMAGES INTO N STRONGLY OVERLAPPING IMAGE CROPS IN A PREDEFINED MANNER DEFINED BY AN OFFSET DIRECTION AND A STRIDE OF K PIXEL(S) ⟿ S235

DOWNSAMPLING EACH IMAGE CROP OF THE N IMAGE CROPS TO THE FIRST RESOLUTION ⟿ S240

APPLYING THE TRAINED GENERATIVE NEURAL NETWORK IN AN AUTOENCODER MODE TO EACH IMAGE CROP OF THE N IMAGE CROPS TO OBTAIN N TRANSLATED CROPS EACH CAPTURING ARTIFACTS AND DISCREPANCIES BETWEEN THE CORRESPONDING IMAGE CROP OF THE ORIGINAL TRAINING IMAGE AND THE TRANSLATED IMAGE CROP PRODUCED BY THE TRAINED GENERATIVE NEURAL NETWORK ⟿ S245

INPUTTING THE N TRANSLATED CROPS INTO THE MERGING NEURAL NETWORK TO OBTAIN A MERGED IMAGE WITH REDUCED ARTIFACTS AND DISCREPANCIES AND COMPARING THE MERGED IMAGE WITH THE CORRESPONDING ORIGINAL IMAGE OF THE SET OF TRAINING IMAGES AND UPDATING PARAMETERS OF THE MERGING NEURAL NETWORK BASED ON A RESULT OF THE COMPARISON ⟿ S250

END

PLAUSIBLE DAYSCALE TIMELAPSE GENERATION METHOD AND COMPUTING DEVICE

CROSS-REFERENCE TO RELATED APPLICATION(S)

This application is a continuation application, claiming priority under § 365(c), of an International application No. PCT/KR2020/015687, filed on Nov. 10, 2020, which is based on and claims the benefit of a Russian patent application number 2019136769, filed on Nov. 15, 2019, in the Russian Intellectual Property Office, and of a Russian patent application number 2020113037, filed on Apr. 7, 2020, in the Russian Intellectual Property Office, the disclosure of each of which is incorporated by reference herein in its entirety.

BACKGROUND

1. Field

The disclosure relates to the field of plausible timelapse video generation from a single image. More particularly, the disclosure relates to methods, computer-implemented systems, computing devices, and computer-readable media for generating plausible dayscale timelapse.

2. Description of Related Art

Over the last few years, the problem of image-to-image translation based on deep neural networks has evolved from translation between two predefined paired domains to the development of unified models for translation between multiple domains. Most classical approaches to image-to-image translation require domain labels. The recent FUNIT model relaxes this constraint to extract the style at inference time, it makes use of several images from the target domain as a guidance for translation (this is known as the few-shot setting), but it still needs domain labels during training. Prior art solutions always use paired or domain-labeled training images to solve the problem of image-to-image translation.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an image-to-image translation approach for the practical task of generating daytime timelapse videos from a single image that could be captured by the user at the user-computing device.

Another aspect of the disclosure is to provide an image-to-image translation approach based on obtaining a dataset of high-resolution diverse dayscale timelapse images or videos is much harder than obtaining a dataset of high-resolution diverse images.

Another aspect of the disclosure is to provide a method that uncovers the implicit domain structure of data without explicit domain supervision rather than collecting domain annotations, which are hard to define and hard to solicit from users.

Another aspect of the disclosure is to provide an Artificial Intelligence (AI)-system training on a large dataset of unaligned images without domain labels. The only external (weak) supervision used in an embodiment of the disclosure is coarse segmentation maps that can be estimated using an off-the-shelf semantic segmentation network.

Additional aspects will be set forth in part in the description which follows and, in part, will be apparent from the description, or may be learned by practice of the presented embodiments.

In accordance with an aspect of the disclosure, a method of generating one or more images of a plausible dayscale timelapse sequence based on a content image using a trained generative neural network and a trained merging neural network is provided. The method includes receiving the content image and (a) one or more predefined styles respectively corresponding to one or more times of day to be applied to the content image or (b) one or more style images having one or more styles to be applied to the content image, slicing the content image into n image crops, applying the trained generative neural network with each of one or more styles to n image crops to obtain n image crops re-stylized according to each of one or more styles, and merging the re-stylized n image crops for each of one or more styles with the trained merging neural network to obtain one or more images of a plausible dayscale timelapse sequence for the content image.

In accordance with another aspect of the disclosure, the generative neural network used in the method is trained in one or in a combination of the following modes swap mode, random mode, and autoencoder mode is provided. The generative neural network includes at least a content encoder, a style encoder, and a decoder.

In accordance with another aspect of the disclosure, a computing device is provided. The computing device includes a processor and a memory storing computer-executable instructions, which, upon the execution by the processor, cause the processor to carry out the method.

In accordance with another aspect of the disclosure, a method of generating one or more images of a plausible dayscale timelapse sequence based on a content image using a trained generative neural network is provided. The method includes receiving the content image and (a) predefined one or more styles to be applied to the content image or (b) one or more style images having one or more styles to be applied to the content image, reducing a resolution of the content image to a lower resolution on the smaller side of the content image while maintaining the aspect ratio of the content image, applying the trained generative neural network with each of one or more styles to the reduced content image to obtain one or more reduced content images re-stylized according to each of one or more styles, and decomposing each of the re-stylized content image into high-frequency components and a low-frequency component having the lower resolution on the smaller side while maintaining the aspect ratio, filtering the low-frequency component by considering the content of the corresponding re-stylized content image, and generating one or more images of the plausible dayscale timelapse sequence based on the filtered low-frequency component and the high-frequency components of each of the corresponding re-stylized content images.

In accordance with another aspect of the disclosure, a computing device is provided. The computing device includes a processor and a memory storing computer-executable instructions, which, upon the execution by the processor, cause the processor to carry out the method.

First, the proposed method makes it possible to carry out image-to-image semantic preserving style transfer without knowledge of the domains represented in the dataset. The internal bias of the collected dataset, the architectural bias, and a specially developed training procedure make it possible to learn style transformations even in this setting.

Second, to ensure fine detail preservation, the disclosed architecture for image-to-image translation combines the two techniques skip connections and adaptive instance normalizations (AdaIN). Such a combination is feasible and leads to an architecture that preserves details much better than currently dominant AdaIN architectures without skip connections. Apart from the main objective of the application, the disclosure can be used to learn multi-domain image stylization/recoloring, achieving quality on par with current state of the art.

Finally, since training a high-capacity image-to-image translation network directly at high resolution is computationally infeasible, a new enhancement scheme (using a merging network) that makes it possible to apply the image-to-image translation network trained at lower resolution to produce high-resolution plausible images.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates a flowchart of training of a generative neural network in a swap mode according to an embodiment of the disclosure;

FIG. 3 illustrates a flowchart of training of a generative neural network in a random mode according to an embodiment of the disclosure;

FIG. 4 illustrates a flowchart of training of a generative neural network in an autoencoder mode according to an embodiment of the disclosure;

FIG. 5 illustrates a flowchart of training of a merging neural network according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior art methods relied on some form of domain/attribute annotations to cope with the decomposition of the image into "content" and "style" that can be independently swapped between images. Such decomposition in the disclosure is facilitated in a fully unsupervised way using an appropriately chosen architecture and a training procedure, described below.

Figure 1:
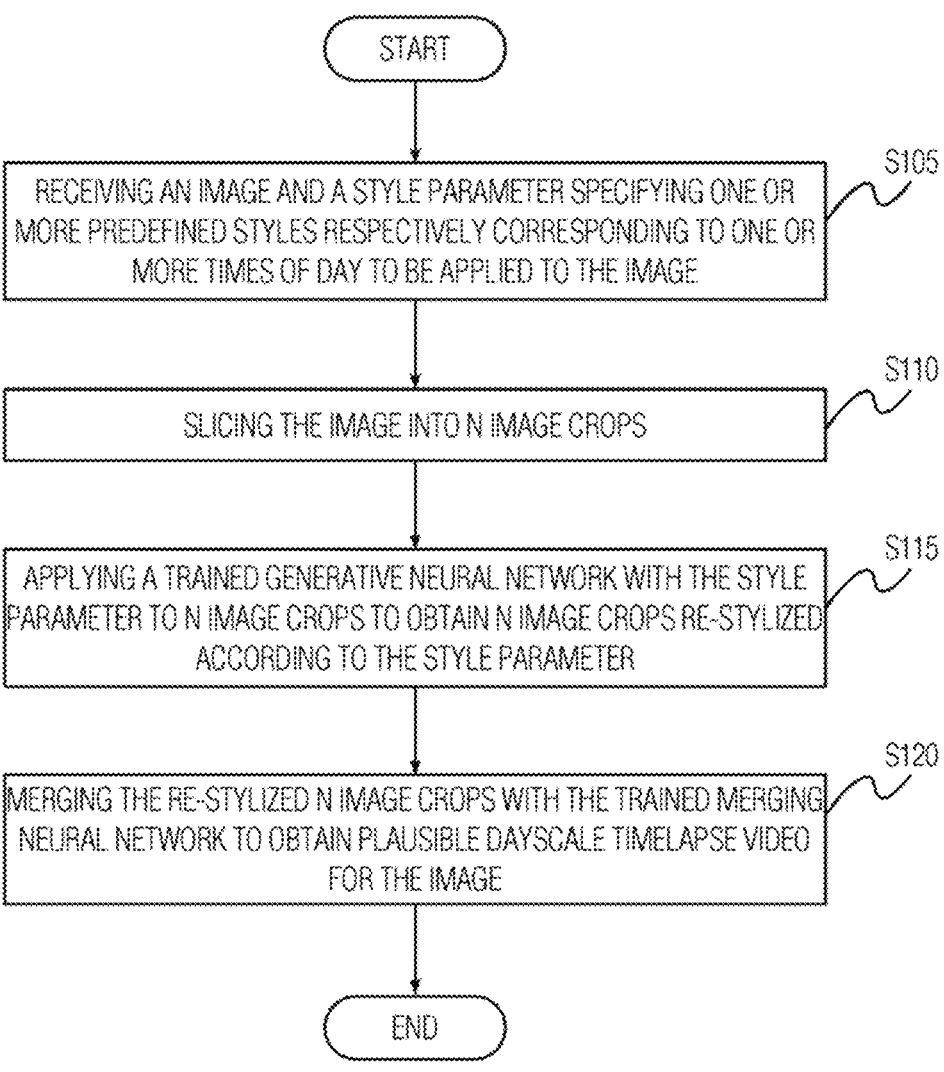
FIG. 1 illustrates a flowchart of a method of generating plausible dayscale timelapse from an image using a trained generative neural network and a trained merging neural network according to an embodiment of the disclosure.

FIG. 1 illustrates a flowchart of a method of generating plausible dayscale timelapse from an image using a trained generative neural network and a trained merging neural network according to an embodiment of the disclosure.

Referring to FIG. 1, a method includes an operation S105 of receiving the image and a style parameter specifying one or more predefined styles respectively corresponding to one or more times of day to be applied to the image. As an alternative, one or more style images having one or more styles to be applied to the content image may be received at the operation S105 instead of the style parameter. The image may be captured or loaded by the user using his/her computing device, such as a smartphone. The style parameter may be specified by the user using his/her computing device. As an example, the user may select a certain point in time or a time range on a timeline, and the one or more predefined styles may be correspondingly determined based on the selected point in time or the time range. It should be noted that if a particular point in time is selected by the user on the timeline, the method will result in plausible dayscale timelapse comprising only a single image generated for that particular point in time. The number of predefined styles is not limited, but it should be clear that for the method to work properly for a particular style the generative neural network has to be pre-trained using a training image conveying such a style.

Then, the method includes an operation S110 of slicing the image into n image crops. The n image crops are image crops strongly overlapping in a predefined manner defined by an offset direction and a stride of k pixel(s). Particular values of n and k are not limited and may be any integers. Then, the method includes an operation S115 of applying the trained generative neural network with the style parameter to n image crops to obtain n image crops re-stylized according to the style parameter and operation S120 of merging the re-stylized n image crops with the trained merging neural network to obtain plausible dayscale timelapse for the image. The generated plausible dayscale timelapse may comprise a single image for a particular style or a sequence of images for a selected sequence of styles.

Figure 10:
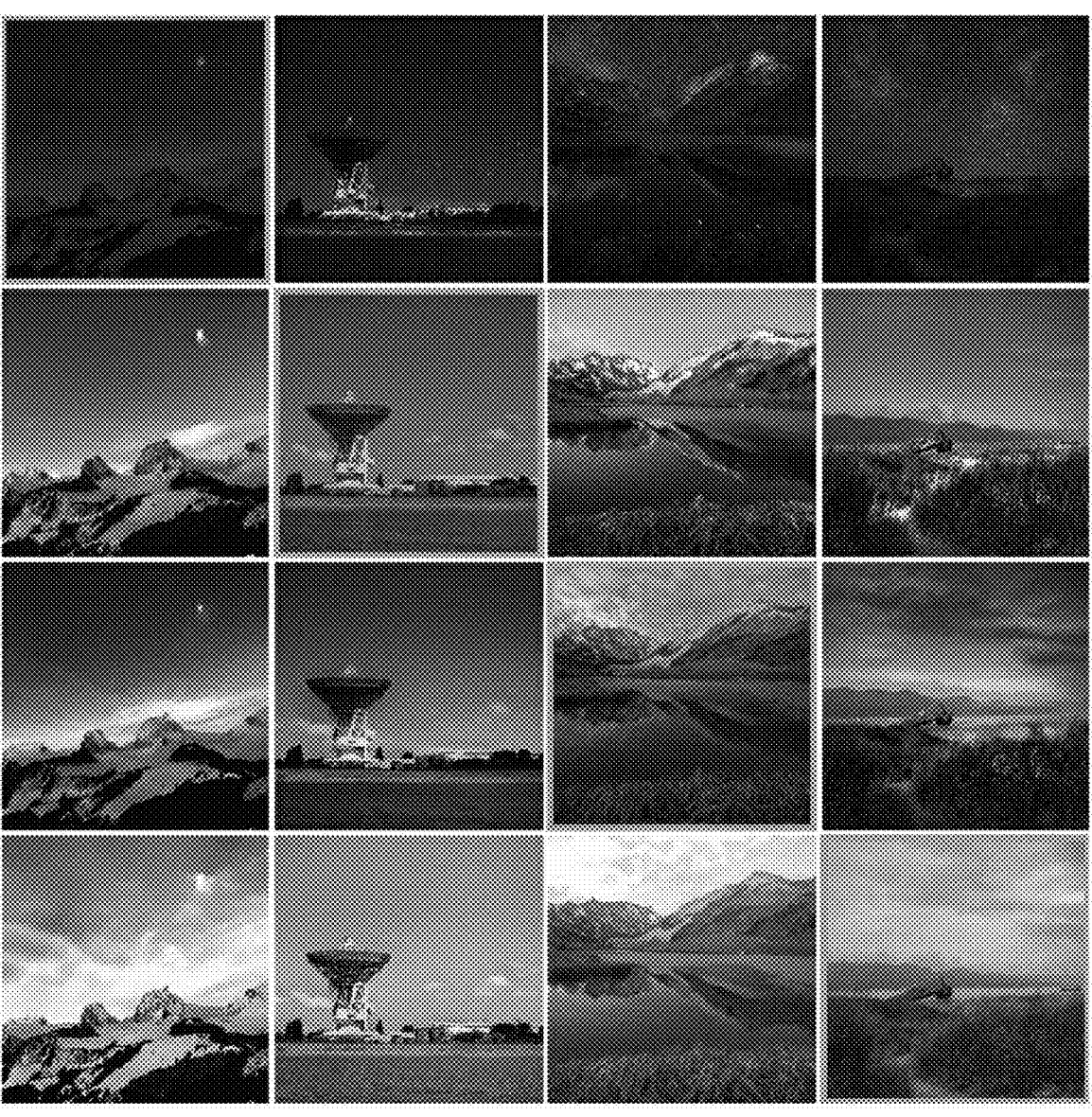
FIG. 10 illustrates various images from a plausible dayscale timelapse generated by a method according to an embodiment of the disclosure.

FIG. 10 illustrates images from the plausible dayscale timelapse generated by the method according to an embodiment of the disclosure.

Few examples of images from the generated plausible dayscale timelapse are illustrated on FIG. 10.

A method (not illustrated) according to the third aspect of the disclosure will now be described relative to the method according to the first aspect in terms of their differences. The method according to the third aspect differs from the method according to the first aspect in that it does not use the merging network and it does not use operation of slicing the image into image crops. Instead, method according to the third aspect of the disclosure includes the operations of reducing a resolution of the content image to a lower resolution on the smaller side of the content image while maintaining the aspect ratio of the content image, decomposing each of the re-stylized content image into high-frequency components and a low-frequency component having the lower resolution on the smaller side while maintaining the aspect ratio, filtering the low-frequency component by considering the content of the corresponding re-stylized content image, and generating one or more images of the plausible dayscale timelapse sequence based on the filtered low-frequency component and the high-frequency components of each of the corresponding re-stylized content images. The Laplacian pyramid may be used in a non-limiting embodiment for the decomposition. The guided filter may be used in a non-limiting embodiment for the filtering, and the content of the corresponding re-stylized content image is used as the guide for the filtering. The lower resolution may be equal to 128, or may be even lower or higher than 128. Training of the generative neural network for the method according to the third aspect differs from the training of the generative neural network for the method according to the first aspect in that the discriminator is not fed directly with the output of the generative neural network, but is fed with the result of applying differentiated guided filter to an original image and a corresponding synthesized (generated) image.

Thus, the generative neural network (also referred to as high resolution daytime translation (HiDT) model) aims to extract independent encodings of content and style from an input image x by using its own architectural bias, with no explicit supervision from the training set, and then construct images with new content style combinations. Thus, an output image that takes the content from x and changes its style according to a selected style parameter. Thus, the task in the disclosure is defined as transferring the style from a style image x' to a content image x rather than using conventional conditional Gallium Nitride (GaN) architectures with categorical variables as conditions.

The generative neural network is trained in one or in a combination of the following modes: swap mode, random mode, and autoencoder mode. In an embodiment, the generative neural network is trained in each of the indicated modes. The following describes the training stages for each of the modes and introduces the particular implementation details that have not be construed as limitations.

FIG. 2 illustrates a flowchart of training of the generative neural network in the swap mode according to an embodiment of the disclosure.

Referring to FIG. 2, the generative neural network includes at least a content encoder, a style encoder, and a decoder. Training of the generative neural network in the swap mode includes the following operations repeatedly performed at a number of iterations: operation S155 of inputting a first image as a training example into the content encoder to obtain a content tensor being a spatially smaller representation of content in the first image. Then, the training includes operation S160 of inputting a second image as a training example into the style encoder to obtain a style vector indicative of style in the second image. The first image and the second image have a first resolution that is lower that a resolution of plausible dayscale timelapse generated by the method described above with reference to FIG. 1. The first image(s) and the second image(s) may be randomly selected from a training dataset of images, for example, landscape images, for the purpose of the generative neural network training.

Then, the training includes operation S165 of inputting the content tensor, the style vector into the decoder to obtain, using adaptive instance normalization, a third image having the content of the first image and the style of the second image, and a segmentation mask corresponding to the first image. Then, the training includes operation S170 of alternately inputting the second image and the style vector or the style vector and the third image into a conditional discriminator configured to determine if the image is plausible enough under the given style, and operation S175 of alternately updating parameters of the generative neural network and the conditional discriminator based on a result of the determination by the conditional discriminator at different iterations to ensure training of the generative neural network and conditional discriminator in an adversarial manner. The segmentation mask is further considered when updating parameters of the generative neural network.

FIG. 3 illustrates a flowchart of training of a generative neural network in a random mode according to an embodiment of the disclosure.

Referring to FIG. 3, training of the generative neural network in the random mode includes the following operations repeatedly performed at a number of iterations: operation S180 of inputting a first image as a training example into the content encoder to obtain a content tensor being a spatially smaller representation of content in the first image. Then, the training includes operation S185 of generating a random style vector from prior distribution and operation S190 of inputting the content tensor, the random style vector into the decoder to obtain, using adaptive instance normalization, a third image having the content of the first image and the style defined by the random style vector, and a segmentation mask corresponding to the first image. The first image and the third image have a first resolution that is lower that a resolution of plausible dayscale timelapse generated by the method described above with reference to FIG. 1. Then, the training includes operation S195 of inputting the random style vector and the third image into a conditional discriminator configured to determine if the image is plausible enough under the given style, and operation S200 of updating parameters of the generative neural network based on a result of the determination by the conditional discriminator to ensure training of the generative neural network and conditional discriminator in an adversarial manner. The segmentation mask is further considered when updating parameters of the generative neural network.

FIG. 4 illustrates a flowchart of training of a generative neural network in an autoencoder mode according to an embodiment of the disclosure.

Referring to FIG. 4, training of the generative neural network in the autoencoder mode includes the following operations repeatedly performed at a number of iterations: operation S205 of inputting a first image as a training example into the content encoder to obtain a content tensor being a spatially smaller representation of content in the first image. Then, the training includes operation S210 of inputting the first image as a training example into the style encoder to obtain a style vector indicative of style in the first image and the operation S215 of inputting the content tensor, the style vector into the decoder to obtain, using adaptive instance normalization, a third image having the content and the style of the first image, and a segmentation mask corresponding to the first image. The first image and the third image have a first resolution that is lower that a resolution of plausible dayscale timelapse generated by the method described above with reference to FIG. 1. Then, the training includes operation S220 of comparing the first image and the third image, and operation S225 of updating parameters of the generative neural network based on a result of the comparison. In a non-limiting embodiment, the comparison may be pixel-by-pixel comparison. The segmentation mask is further considered when updating parameters of the generative neural network.

Thus, during training, the decoder of the generative neural network is predicting not only the input image x but also a corresponding segmentation mask m (produced by an external pretrained network). The disclosure does not aim to achieve state of the art segmentation as a byproduct, but segmentation in generative neural network helps to control the style transfer and better preserve the semantic layout. Otherwise, there is nothing preventing the generative neural network from repainting, say, grass into water or vice versa. Note that segmentation masks are not given as input to the networks, and are thus not needed at inference (in-use) stage.

Throughout the specification, the space of input images is denoted by $\Psi$, their segmentation masks are denoted by $\mathcal{M}$, and individual images with segmentation masks are denoted by $x,m \in \chi \times \mathcal{M}$; the space of latent content codes c is $c \in \mathcal{C}$, and the space of latent style codes s is $s \in \mathcal{S}$ ($\mathcal{S} = \mathbb{R}^3$ while $\mathcal{C}$ has a more complex structure). To extract c and s from an image x, the generative neural network employs two encoders: $E_c:\chi \to \mathcal{C}$ extracts the content representation c of the input image x, $E_s:\chi \to \mathcal{S}$ extracts the style representation s of the input image x. Given a latent content code $c \in \mathcal{C}$ and a latent style code $S \in \mathcal{S}$, the decoder (generator) $G:\mathcal{C} \times \mathcal{S} \to \chi \times \mathcal{M}$ of the generative neural network generate a new image $\hat{x}$ and the corresponding segmentation mask $\hat{m}$. Thus, the generative neural network is capable of combining content from x and style from x' as $(\hat{x}, \hat{m})=G(E_c(x),E_s(x'))$. The generative neural network thus combines at least the style encoder $E_s$, the content encoder $E_c$, and the decoder G, starting from (i) two input images x and x' or starting from (ii) input image x and a style parameter specifying one or more predefined styles respectively corresponding to one or more times of day to be applied to the image. The style parameter may be extracted from the image x' or directly inputted by the user, for example, as described above with reference to the "timeline".

Figure 7:
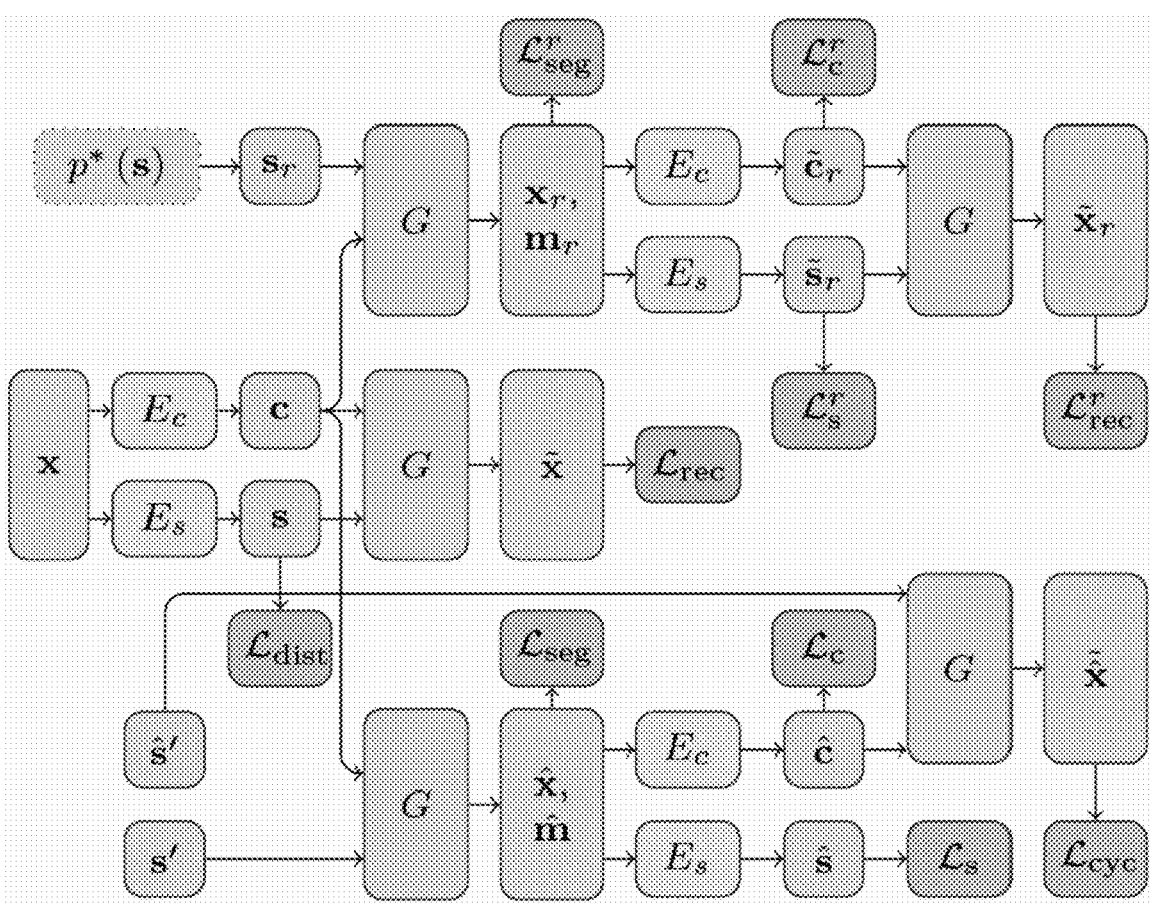
FIG. 7 illustrates a data flow in a possible implementation of a generative neural network according to an embodiment of the disclosure.

FIG. 7 illustrates a data flow in a possible implementation of a generative neural network according to an embodiment of the disclosure.

Referring to FIG. 7, it illustrates half of the (symmetric) architecture. $s'=E_s(x')$ is the style extracted from the other image x', and $\hat{s}'$ is obtained similarly to s' with x and x' swapped. The illustration denotes data elements; loss functions; functions (subnetworks). Functions with identical labels have shared weights.

Loss functions applicable in the generative neural network:

Adversarial loss. The generative neural network has to generate plausible and realistic timelapse image(s), as defined in the usual adversarial fashion. To account for styles, two discriminators are used, an unconditional discriminator $D:\chi \to \mathbb{R}$ and a conditional discriminator $D_s:\chi \times \mathcal{S} \to \mathbb{R}$. Both try to distinguish between real and translated images using, as an example, the least squares GaN approach. "Fake" image produced from real content and style images x, $x' \in \chi$, $s'=E_s(x')$ is defined as $\hat{x}=G(E_c(x),E_s(x'))$. The same scheme is used for images produced with random style $s_r\sim p^*(s)$. The projection conditioning scheme may be used and the styles are detached from the computational graph when feeding them to $D_s$ during the decoder parameters update operation. Real images use styles extracted from them, while generated images are coupled with styles they were translated to. FIG. 7 does not illustrate adversarial losses.

Image reconstruction loss. The image reconstruction loss $\mathcal{L}_{rec}$ is defined as the $L_1$-norm of the difference between original and reconstructed images. The image reconstruction loss is applied at least three times in the architecture of the generative neural network: to the reconstruction $\tilde{x}$ of the content image x, $\mathcal{L}_{rec}=\|\tilde{x}-x\|_1$, to the reconstruction $\tilde{x}_r$ of the random style image $x_r$, $\mathcal{L}_{rec}=\|\tilde{x}_r-x_r\|_1$, and to the reconstruction $\hat{x}$ of the image x from the content of the stylized image $\hat{x}$ and the style of the stylized image $\hat{x}'$ (cross cycle consistency): $\mathcal{L}_{cyc}=\|\hat{x}-x\|_1$, where $\hat{x}=G(\hat{c},\hat{s})$ (see FIG. 7).

Segmentation loss. The segmentation loss $\mathcal{L}_{seg}$ is used together with the image reconstruction loss and defined as the cross entropy $CE(m; \hat{m})=-\Sigma_{(i,j)}m_{i,j} \log m_{i,j}$ between the original m and reconstructed $\hat{m}$ segmentation masks. The segmentation loss is applied at least twice in the architecture of the generative neural network twice: to the segmentation mask $\hat{m}$ of the translated image, $\mathcal{L}_{seg}=CE(m; \hat{m})$, and to the mask $m_r$ of the random style image $$\mathcal{L}_{seg}^r = CE(m; \hat{m}).$$

Latent reconstruction loss. Two more reconstruction losses, $\mathcal{L}_s$ and $\mathcal{L}_c$, deal with the style and content codes; said reconstruction losses are applied to the difference between original and reconstructed codes and used at least twice in the architecture of the generative neural network. First, for the style $\tilde{s}_r$ and content $\tilde{c}_r$ of the random style image $\hat{x}_r$, $\hat{m}_r$, where the style should match $s^r$ and the content should match $$c: \mathcal{L}_s^r = \|\tilde{s}_r - s_r\|_1, \mathcal{L}_c^r = \|\tilde{c}_r - c_r\|_1.$$

Second, for the style $\hat{s}$ and content $\hat{c}$ of the stylized image $\hat{x},\hat{m}$, where the style should match s' and the content should match c; the $L_1$ loss, but without the limitation, may be applied to content, $\mathcal{L}_c=\|\hat{c}-c\|_1$, and a more robust loss function may be applied to styles in order to avoid reducing them to zero:

$$\mathcal{L}_s = \|\hat{s} - s'\|_1 + \frac{\|\hat{s} - s'\|_1}{\|s'\|_1} + CosineDist(\hat{s}, s').$$

Style distribution loss. To enforce the structure of the space of extracted style codes, the style distribution loss may be applied to a pool of styles collected from a number of previous training iterations. Namely, for a given pool size T the styles $\{s^1 \ldots s^T\}$ may be collected from past minibatches with the stop gradient operation applied, extracted styles s and s' (which are part of the current computational graph) may be added to this pool, and the mean vector $\mu_s$ and covariance matrix $\hat{\Sigma}_s$ may be calculated using the updated pool. Then the style distribution loss matches empirical moments of the resulting distribution to the theoretical moments of the random style vector decoder $\mathcal{N}$ (0,I): $\mathcal{L}_{dist} = \|\hat{\mu}_T\|_1 + \|\hat{\Sigma}_T - \|_1 + \|diag(\hat{\Sigma}_T) - 1\|_1$. Since the space $s = \mathbb{R}^3$ is low-dimensional, and the target is the standard normal distribution $\mathcal{N}$ (0,I), this simplified approach suffices to enforce the structure in the space of latent codes. After computing the loss value, the oldest styles are removed from the pool to keep its size at T.

Total loss function. Thus, overall generative neural network is jointly training the style encoder, content encoder, decoder, and discriminator with the following objective:

$$\min_{E_c, E_s, G} \max_G \mathcal{L}(E_c, E_s, G, D) = \qquad\qquad \text{Equation ... (1)}$$

$$\lambda_1(\mathcal{L}_{adv} + \mathcal{L}^r_{adv}) + \lambda_2(\mathcal{L}_{rec} + \mathcal{L}^r_{rec} + \mathcal{L}_{cyc}) +$$

$$\lambda_3(\mathcal{L}_{seg} + \mathcal{L}^r_{seg}) + \lambda_4(\mathcal{L}_c + \mathcal{L}^r_c) + \lambda_5\mathcal{L}_5 + \lambda_6\mathcal{L}^r_s + \lambda_7\mathcal{L}_{dist}$$

Hyperparameters $\lambda_1 \ldots \lambda_7$ define the relative importance of the components in the overall loss function; they have been determined empirically.

The experiments revealed that the projection discriminator significantly improves the results, while removing the segmentation loss function sometimes leads to undesirable "hallucinations" caused by the decoder. However, the model is still well trained without segmentation loss function. The experiments also demonstrated that the style distribution loss function is not necessary. It is suggested that this is due to the usage of both the projection discriminator and random styles during training.

Adaptive U-Net Architecture

To create a plausible daytime landscape image, the model should preserve details from the original image. Thus, the generative neural network may incorporate one or more dense skip connections configured to convey high frequency features not conveyed by the content tensor of the first image to the decoder. To implement this the FUNIT-inspired encoder-decoder architecture may be enhanced with dense skip connections between the downsampling part of $E_c$ and the upsampling part of G. Unfortunately, regular skip connections would also preserve the style of the initial input. Therefore, in an embodiment an additional convolutional block with AdaIN is introduced and applied to the skip connections.

Figure 8:
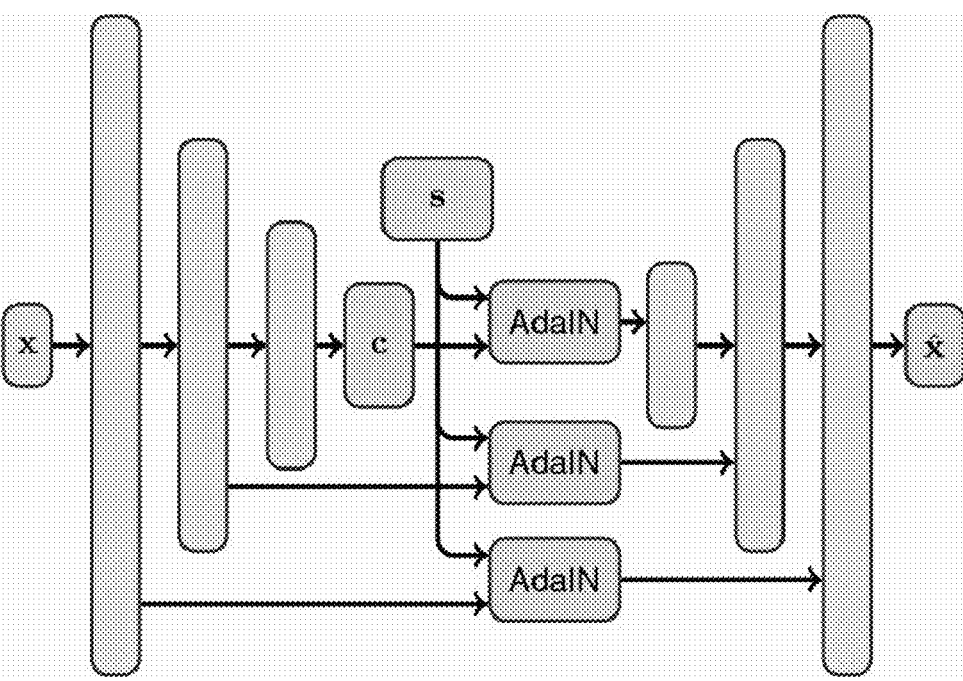
FIG. 8 illustrates a diagram of an adaptive U-Net architecture according to an embodiment of the disclosure.

FIG. 8 illustrates a diagram of the adaptive U-Net architecture: an encoder-decoder network with dense skip-connections and content-style decomposition (c, s) according to an embodiment of the disclosure.

Referring to FIG. 8, the overall architecture has the following structure: the content encoder $E_c$ maps the initial image to a 3D tensor c using several convolutional downsampling layers and residual blocks. In a non-limiting embodiment, the style encoder $E_s$ is a fully convolutional network that ends with global pooling and a compressing 1×1 convolutional layer. The decoder G processes c with several residual blocks with AdaIN modules inside and then upsamples the processed c.

Enhancement Postprocessing Using Merging Neural Network

Training a network which can effectively operate with high resolution images is difficult due to the hardware constraints in both memory and computation time. Applying a fully convolutional neural network directly to a higher resolution image or using a guided filter are applicable techniques to deal with high-resolution images. Although these techniques demonstrate good results in most cases, they have some limitations. A fully convolutional application might yield scene corruption due to limited receptive field, which is the case with sunsets where multiple suns might be drawn, or water reflections where the border between sky and water surface might be confused. Guided filter, on the other hand, works great with water or sun but fails if small details like twigs were changed by the style transfer procedure, or at the horizon or any other highly contrastive border if it was strongly affected, yielding "halo" effect. Such cases might seem a corner case not worth considering but they are crucial in the daytime translation task, which leads us to the necessity of having the semantic preserving upscale method. Also, straight-forward application of superresolution methods and pretrained models are not possible due to the much bigger discrepancy between bicubic downsampling kernel and artifacts, yielded by image to image network.

FIG. 5 illustrates a flowchart of training of a merging neural network according to an embodiment of the disclosure.

Referring to FIG. 5, a separate merging neural network (also referred to as enhancement network) $G_{enh}$ to upscale the translated image and simultaneously remove the artifacts that are "typical" for the trained and frozen decoder G is provided. In an embodiment of the disclosure training of the merging neural network includes the following operations repeatedly performed at a number of iterations: operation S230 of obtaining a set of training images each having a second resolution higher that the first resolution. Then, the training includes operation S235 of slicing each image of the set of training images into n strongly overlapping image crops in a predefined manner defined by an offset direction and a stride of k pixel(s). Values of n and k are not limited herein. Offset direction indicates a direction of offset of one image relative to another strongly overlapping image crop and a stride indicates an amount of offset between image crops (i.e. a non-overlapping area between image crops). Then, the training includes operation S240 of downsampling each image crop of the n image crops to the first resolution and operation S245 of applying the trained generative neural network in an autoencoder mode to each image crop of the n image crops to obtain n translated crops each capturing artifacts and discrepancies between the corresponding image crop of the original training image and the translated image crop produced by the trained generative neural network. At the end, the training includes operation S250 of inputting the n translated crops into the merging neural network to obtain a merged image with reduced artifacts and discrepancies, comparing the merged image with the corresponding original image of the set of training images, and updating parameters of the merging neural network based on a result of the comparison.

Compared to prior art several red green blue (RGB) images are used as input instead of feature maps. The disclosed method relies on usage of the decoder in "auto-encoder" mode to obtain a paired dataset, training the merging neural network in a supervised way and capturing the most common artifacts and discrepancies between the real image and the one produced by the decoder. To further improve generalization to translated images the decoder may be used in "random style" mode to obtain an additional unsupervised set, to which supervised (perceptual and feature matching) losses are not applied. For brevity, loss functions for the "autoencoder" mode only are discussed below.

In a particular implementation high resolution image $x_{hi}$ (1024×1024 in the experiments) are covered with strongly overlapping frames $$\{x_{hi}^{(i)}\}_i$$

of equal width and height with a stride of 1 pixel; each frame is only a few pixels smaller than $x_{hi}$. The frames are downscaled with a bilinear kernel to the resolution suitable for the decoder of the generative neural network (in a non-limiting example, 256×256 with scale factor 4), resulting in a set of downscaled crops $$\{x_{lo}^{(i)}\}_i.$$

Then, the generative neural network is applied to the set of downscaled crops $$\{x_{lo}^{(i)}\}_i,$$

which results in low resolution images $$\{\hat{x}_{lo}^{(i)}\}_i, \hat{x}_{lo}^{(i)} = G\!\left(E_c\!\left(x_{lo}^{(i)}\right), E_s\!\left(x_{lo}^{(i)}\right)\right).$$

These frames are stacked into a single tensor in a fixed order and fed to the merging neural network $G_{enh}$ that intends to restore the original image $x_{hi}$, with the result $$\hat{x}_{hi} = G\!\left(\{\hat{x}_{lo}^{(i)}\}_i\right).$$

Figure 9:
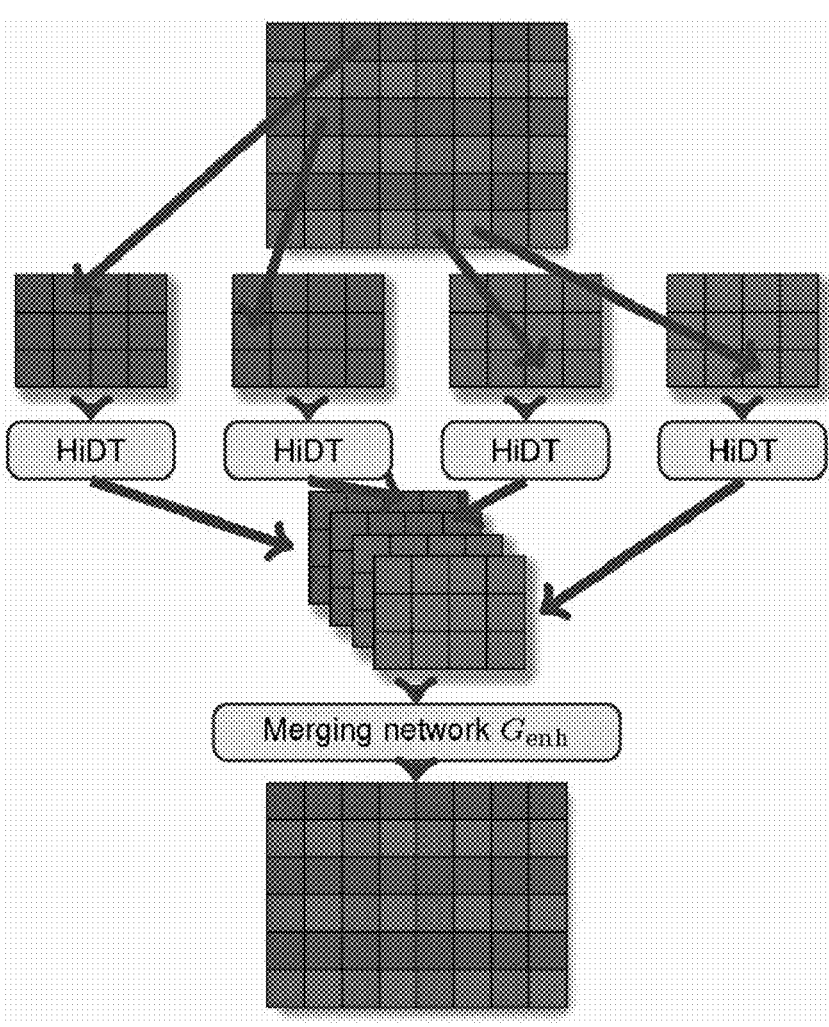
FIG. 9 illustrates a diagram of an enhancement scheme according to an embodiment of the disclosure.

FIG. 9 illustrates a diagram of an enhancement scheme according to an embodiment of the disclosure.

A representation of the process is illustrated in FIG. 9.

For $G_{enh}$, the training setting of pix2pixHD may be used with perceptual, feature matching, and adversarial loss functions. High-resolution original images are used as supervision. $G_{enh}$ may use one or more of the following loss functions during training: (1) perceptual reconstruction loss between $x_{hi}$ and $x_{hi}$: $\mathcal{L}_{enh}^{perc} = \|VGG(\hat{x}_{hi}) - VGG(x_{hi})\|_1$;

feature matching loss between $\hat{x}_{hi}$ and $x_{hi}$, using each feature map of each discriminator (there are three of them in the multi-scale architecture):

$$\mathcal{L}_{enh}^{feat} = \sum_{Layers1} \left\|D_{enh}^{(l)}(\hat{x}_{hi}) - D_{enh}^{(l)}(x_{hi})\right\|_1;$$

(3) adversarial loss based on LSGAN:

$$\mathcal{L}_{enh}^{adv}(D) = \mathcal{L}_{LS}^D(D_{enh}(x_{hi}), D_{enh}(\hat{x}_{hi})), \mathcal{L}_{enh}^{adv}(G) = \mathcal{L}_{LS}^G(D_{enh}(\hat{x}_{hi})).$$

Implementation details:

Training details. The particular implementation details given below shall be merely considered as non-limiting examples. In an implementation, the content encoder may comprise two downsampling and four residual blocks; after each downsampling, only 5 channels may be used for skip connections. The style encoder contains four downsampling blocks, and then the downsampled result may be averaged with respect to spatial information into a three-dimensional vector. The decoder may comprise five residual blocks with AdaIN inside and two upsampling blocks. AdaIN parameters may be computed from a style vector via a three-layer feedforward network. Both discriminators are multi-scale, with three downsampling levels. The generative neural network may be trained for a number of iterations (as an example, about 450 thousand iterations) with batch size 4. For training, the images may be downscaled to the resolution of 256×256. In a particular example, the loss weights were empirically determined as $\lambda_1=5$, $\lambda_2=2$, $\lambda_3=3$, $\lambda_4=1$, $\lambda_5=0.1$, $\lambda_6=4$, $\lambda_7=1$. Adam optimizer may be used with $\beta_1=0.5$, $\beta_2=0.999$, and initial learning rate 0.0001 for both generators and discriminators, halving the learning rate every 200000 iterations.

Dataset and daytime classifier. A dataset of 20,000 landscape photos has been collected from the Internet. A small part of these images was manually labeled into four classes (night, sunset/sunrise, morning/evening, noon, without the limitation) using a crowdsourcing platform. More or less classes may be used in other embodiments. A ResNet-based classifier may be trained on those labels and applied to the rest of the dataset. Predicted labels may be used in two ways: (1) to balance the training set for image translation models with respect to daytime classes; (2) to provide domain labels for baseline models. Segmentation masks were produced by an external model and reduced to 9 classes: sky, grass, ground, mountains, water, buildings, trees, roads, and humans. More or less classes may be used in other embodiments. Importantly, one application of the disclosed generative neural network is daytime timelapse generation using a particular video as a guidance.

OTHER EMBODIMENTS

Figure 6:
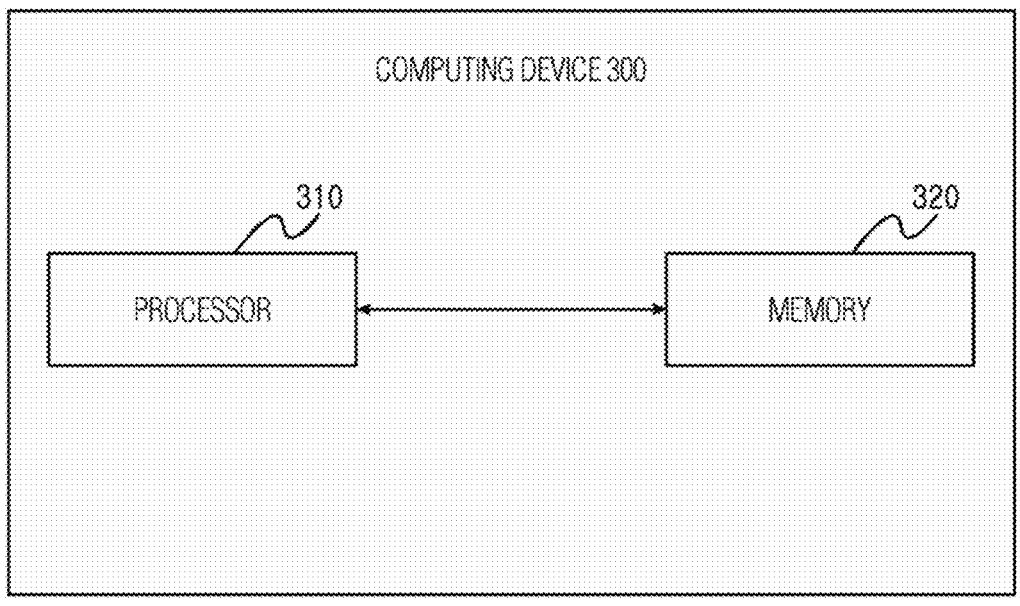
FIG. 6 illustrates block diagram of a computing device capable of performing a method according to an embodiment of the disclosure.

FIG. 6 illustrates block diagram of a computing device capable of performing a method according to an embodiment of the disclosure.

Referring to FIG. 6, the computing device 300 (such as, for example, a smartphone, a tablet, a notebook, a smartwatch etc.) includes a processor 310 and a memory 320 storing computer-executable instructions, which, upon execution by the processor, cause the processor to carry out the method according to the first aspect. The processor 310 and the memory 320 are communicatively coupled with each other. In non-limiting embodiments the processor 310 may implemented as a computing means including, but not limited to, a general-purpose processor, an application-specific integrated circuit (ASIC), a user-programmable gate array (FPGA), or a system-on-chip (SoC). Such computing devices or any other user devices may also comprise memory (RAM, ROM etc.), a (touch) screen, I/O means, a camera, a communication means and so on.

The proposed method may also be embodied on computer-readable medium having stored thereon computer-executable instructions that when executed by processing or computing means of a device, cause the device to perform any operation(s) of the proposed method of generating plausible high-resolution dayscale timelapse. Any types of data may be processed by the artificial intelligent systems trained using the above-described approaches. Learning phase may be performed offline.

In the disclosure, a novel image-to-image translation model that does not rely on domain labels during either training or inference is provided. The new enhancement scheme makes it possible to increase the resolution of translation outputs. The proposed model is able to learn daytime translation for high-resolution landscape images. The proposed model can be easily generalized to other domains, for example, to generate timelapse images of flowers, pets, humans etc. It will be clear for a skilled person that for other domains the generative neural network has to be trained on corresponding training datasets, for example, a training dataset of flowers images, a training dataset of pet images, and a training dataset of human images.

The disclosed model is capable of generating images using styles extracted from images, as well as sampled from the prior distribution. An appealing straightforward application of the model is the generation of timelapses from a single image (the task currently mainly tackled with paired datasets).

It should be expressly understood that not all technical effects mentioned herein need to be enjoyed in each and every embodiment of the technology. For example, embodiments of the technology may be implemented without the user enjoying some of these technical effects, while other embodiments may be implemented with the user enjoying other technical effects or none at all.

Modifications and improvements to the above-described implementations of the technology may become apparent to those skilled in the art. The foregoing description is intended to be exemplary rather than limiting. The scope of the technology is therefore intended to be limited solely by the scope of the appended claims.

While the disclosure has been shown and described with reference to particular operations performed in a particular order, it will be understood that these operations may be combined, sub-divided, or reordered without departing from the teachings of the technology. Accordingly, the order and grouping of operations is not a limitation of the technology.

What is claimed is:

1. A method performed by a computing device of generating one or more images of a plausible dayscale timelapse sequence based on a content image using a trained generative neural network and a trained merging neural network, the method comprising:

receiving, by the computing device, the content image and one of a predefined one or more styles to be applied to the content image or one or more style images having one or more styles to be applied to the content image;

slicing, by the computing device, the content image into n image crops by slicing each image of a set of training images into n strongly overlapping image crops in a predefined manner defined by an offset direction and a stride of k pixels;

applying, by the computing device, the trained generative neural network with each of one or more styles to n image crops to obtain n image crops re-stylized according to each of one or more styles; and merging, by the computing device, the re-stylized n image crops for each of the one or more styles with the trained merging neural network to obtain one or more images of a plausible dayscale timelapse sequence for the content image, wherein the re-stylized n image crops are generated without directly feeding a discriminator to the generative neural network, wherein the trained generative neural network is initially and iteratively trained in a swap mode using the following operations repeatedly performed at a number of iterations:

inputting a first image as a training example into a content encoder to obtain a content tensor being a spatially smaller representation of content in the first image;

inputting a second image as a training example into a style encoder to obtain a style vector indicative of a style in the second image;

inputting the content tensor, the style vector into a decoder to obtain, using adaptive instance normalization, a third image having content of the first image and a style of the second image, and a segmentation mask corresponding to the first image;

alternately inputting the second image and the style vector or the style vector and the third image into a conditional discriminator configured to determine when an image is plausible enough under a given style; and alternately updating parameters of the trained generative neural network and the conditional discriminator at different iterations based on a result of a determination by the conditional discriminator to ensure training of the trained generative neural network and conditional discriminator in an adversarial manner, wherein in updating parameters of the trained generative neural network the segmentation mask is further considered, and wherein the first image and the second image have a first resolution.

2. The method of claim 1, wherein the trained generative neural network is initially and iteratively trained in one or in a combination of the following modes: a swap mode, a random mode, or an autoencoder mode.

3. The method of claim 2, wherein the trained generative neural network is initially and iteratively trained in the random mode using the following operations repeatedly performed at a number of iterations:

inputting a first image as a training example into the content encoder to obtain a content tensor being a spatially smaller representation of content in the first image;

generating a random style vector from prior distribution;

inputting the content tensor, the random style vector into the decoder to obtain, using adaptive instance normalization, a third image having a content of the first image and a style defined by the random style vector, and a segmentation mask corresponding to the first image;

inputting the random style vector and the third image into a conditional discriminator configured to determine when the third image is plausible enough under a given style; and updating parameters of the trained generative neural network based on a result of a determination by the conditional discriminator to ensure training of the trained generative neural network and conditional discriminator in an adversarial manner, and wherein in updating parameters of the trained generative neural network the segmentation mask is further considered.

4. The method of claim 2, wherein the trained generative neural network is initially and iteratively trained in the autoencoder mode using the following operations repeatedly performed at a number of iterations:

inputting a first image as a training example into the content encoder to obtain a content tensor being a spatially smaller representation of content in the first image;

inputting the first image as a training example into the style encoder to obtain a style vector indicative of a style in the first image;

inputting the content tensor, the style vector into the decoder to obtain, using adaptive instance normalization, a third image having the content and a style of the first image, and a segmentation mask corresponding to the first image;

comparing the first image and the third image; and updating parameters of the trained generative neural network based on a result of the comparison, and wherein in updating parameters of the trained generative neural network the segmentation mask is further considered.

5. The method of claim 4, wherein the trained generative neural network comprises one or more dense skip connections configured to convey high frequency features not conveyed by the content tensor of the first image to the decoder.

6. The method of claim 1, wherein the merging neural network is initially and iteratively trained using the following operations repeatedly performed at a number of iterations:

obtaining a set of training images each having a second resolution downsampling each image crop of the n image crops to a first resolution;

applying the trained generative neural network in an autoencoder mode to each image crop of the n image crops to obtain n translated crops each capturing artifacts and discrepancies between a corresponding image crop of an original training image and the translated image crop produced by the trained generative neural network;

inputting the n translated crops into the merging neural network to obtain a merged image with reduced artifacts and discrepancies, comparing the merged image with a corresponding original image of the set of training images; and updating parameters of the merging neural network based on a result of the comparison, and wherein the merged image has the second resolution.

7. The method of claim 1, wherein one or more styles respectively correspond to one or more times of day to be applied to the content image.

8. A computing device comprising:

memory storing one or more computer programs; and one or more processors communicatively coupled to the memory, wherein the one or more computer programs include computer-executable instructions that, when executed by the one or more processors individually or collectively, cause the computing device to:

receive a content image and one of a predefined one or more styles to be applied to the content image or one or more style images having one or more styles to be applied to the content image, slice the content image into n image crops by slicing each image of a set of training images into n strongly overlapping image crops in a predefined manner defined by an offset direction and a stride of k pixels, apply a trained generative neural network with each of one or more styles to n image crops to obtain n image crops re-stylized according to each of the one or more styles, and merge the re-stylized n image crops for each of one or more styles with the trained merging neural network to obtain one or more images of a plausible dayscale timelapse sequence for the content image, and wherein the re-stylized n image crops are generated without directly feeding a discriminator to the generative neural network, wherein the trained generative neural network is initially and iteratively trained in a swap mode using the following operations repeatedly performed at a number of iterations:

inputting a first image as a training example into a content encoder to obtain a content tensor being a spatially smaller representation of content in the first image;

inputting a second image as a training example into a style encoder to obtain a style vector indicative of a style in the second image;

inputting the content tensor, the style vector into a decoder to obtain, using adaptive instance normalization, a third image having content of the first image and a style of the second image, and a segmentation mask corresponding to the first image;

alternately inputting the second image and the style vector or the style vector and the third image into a conditional discriminator configured to determine when an image is plausible enough under a given style; and alternately updating parameters of the trained generative neural network and the conditional discriminator at different iterations based on a result of a determination by the conditional discriminator to ensure training of the trained generative neural network and conditional discriminator in an adversarial manner, wherein in updating parameters of the trained generative neural network the segmentation mask is further considered, and wherein the first image and the second image have a first resolution.

9. A method performed by a computing device of generating one or more images of a plausible dayscale timelapse sequence based on a content image using a trained generative neural network, the method comprising:

receiving, by the computing device, the content image and at least one predefined one or more styles to be applied to the content image or one or more style images having one or more styles to be applied to the content image;

reducing, by the computing device, a resolution of the content image to a lower resolution while maintaining an aspect ratio of the content image;

applying, by the computing device, the trained generative neural network with each of one or more styles to the reduced resolution of the content image to obtain one or more reduced content images re-stylized according to each of one or more styles;

decomposing, by the computing device, each of a re-stylized content image into high-frequency components and a low-frequency component having the lower resolution while maintaining the aspect ratio;

filtering, by the computing device, the low-frequency component by considering the content of a corresponding re-stylized content image; and generating, by the computing device, one or more images of the plausible dayscale timelapse sequence based on the filtered low-frequency component and the high-frequency components of each of corresponding re-stylized content images, wherein the obtained one or more reduced content images re-stylized according to each of one or more styles is obtained without directly feeding a discriminator to the generative neural network, and wherein the generated one or more images of the plausible dayscale timelapse sequence are generated by applying a differentiated guided filter to the content image and a corresponding one of the obtained one or more reduced content images re-stylized according to each of one or more styles.

10. The method of claim 9, wherein a Laplacian pyramid is used for the decomposition.

11. The method of claim 9, wherein a guided filter is used for the filtering, and wherein the content of the corresponding re-stylized content image is used as a guide for the filtering.

12. The method of claim 9, wherein the trained generative neural network is initially and repeatedly trained in one or in a combination of the following modes: a swap mode, a random mode, or an autoencoder mode.

13. The method of claim 9, wherein the trained generative neural network comprises a content encoder, a style encoder, and a decoder.

14. The method of claim 13, wherein the content encoder comprises two downsamplings and four residual blocks after each downsampling.

15. The method of claim 13, wherein the style encoder contains four downsampling blocks, and a downsampled result is averaged with respect to spatial information into a three-dimensional vector.

16. The method of claim 13, wherein the decoder comprises five residual blocks with an adaptive instance normalizations (AdaIN) therein and two upsampling blocks.

* * * * *